United States Patent [19]
Frye, Jr. et al.

[11] 3,865,479
[45] Feb. 11, 1975

[54] RANDOM ACCESS PROJECTOR AND MULTI-FRAME CARTRIDGE THEREFORE

[75] Inventors: George L. Frye, Jr.; Herman B. Gibson, Jr., both of Orlando, Fla.

[73] Assignee: Educational Computer Corporation, Strafford, Pa.

[22] Filed: July 23, 1973

[21] Appl. No.: 381,774

[52] U.S. Cl. .................................. 353/110, 353/120
[51] Int. Cl. .......................................... G03b 23/10
[58] Field of Search ......... 353/108, 110, 25, 26, 27, 353/120

[56] References Cited
UNITED STATES PATENTS

| | | | |
|---|---|---|---|
| 1,254,239 | 1/1918 | Koells | 353/110 |
| 2,227,071 | 12/1946 | Dilks | 353/110 |
| 2,540,872 | 2/1951 | Fleisher | 353/110 |
| 2,727,433 | 12/1955 | Nicholaus | 353/110 |

FOREIGN PATENTS OR APPLICATIONS

| | | | |
|---|---|---|---|
| 1,522,511 | 9/1969 | Germany | 353/27 |

*Primary Examiner*—Richard E. Aegerter
*Assistant Examiner*—A. J. Mirabito

[57] ABSTRACT

A random access projector and a multiple frame bearing cartridge therefore are disclosed. The projector includes digital logic circuitry for controlling a stepping motor which is mechanically constrained to generate motion along a spiral path. The cartridge includes a plurality of transparencies formed in a spiral pattern on a transparent disc; the disc being positioned by the motor and the individual frames being brought into registration with the optical path of the projector as the motor generates the spiral motion path.

18 Claims, 9 Drawing Figures

3,865,479

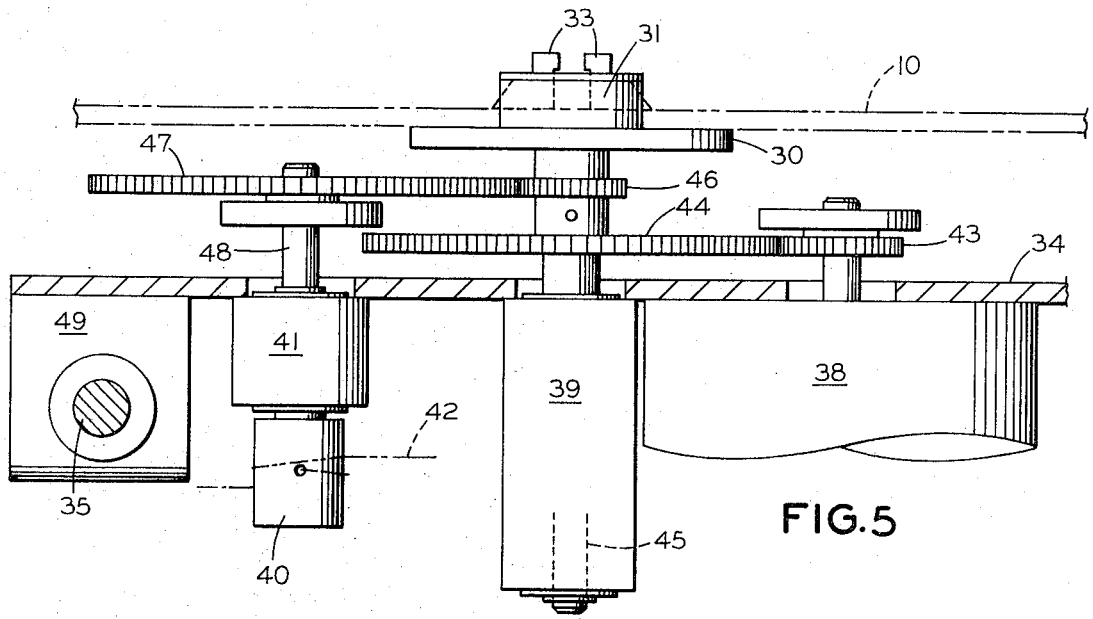
FIG.5
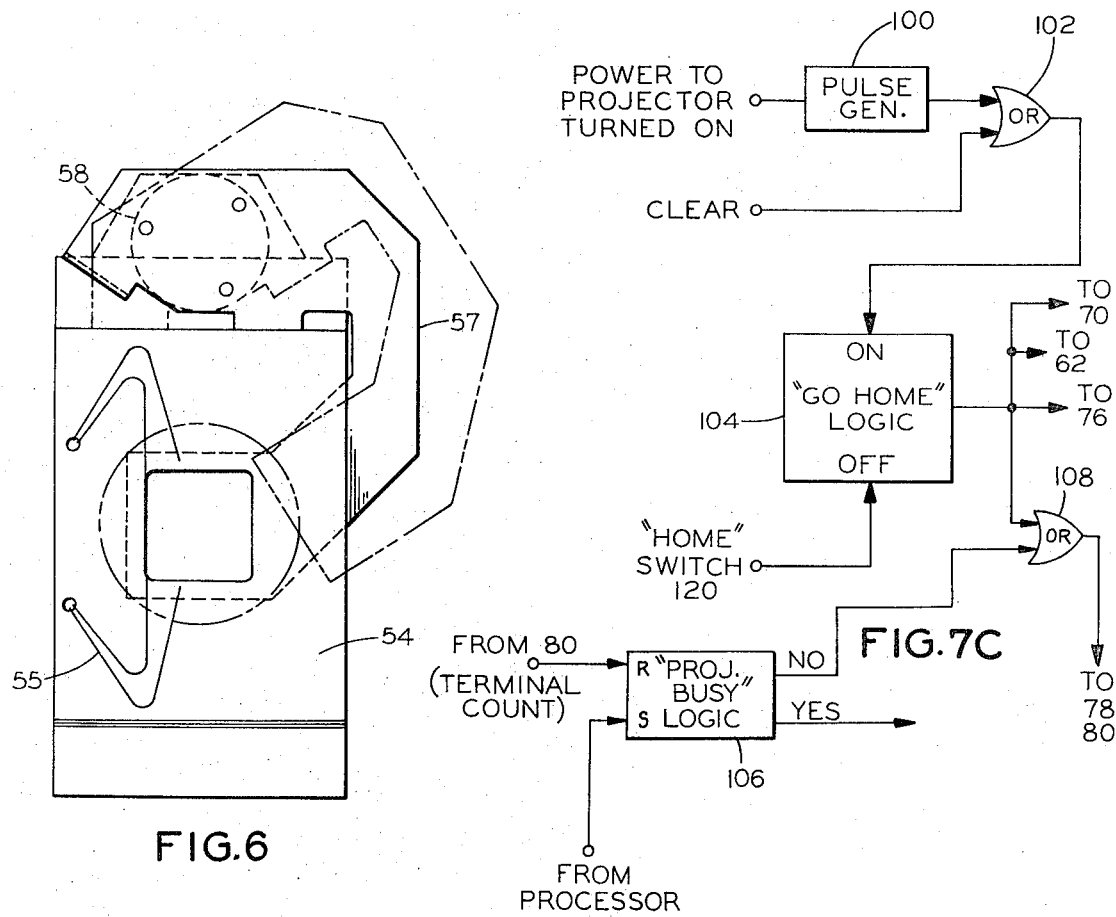
FIG.6
FIG.7C

RANDOM ACCESS PROJECTOR AND MULTI-FRAME CARTRIDGE THEREFORE

BACKGROUND OF THE INVENTION:

1. Field of the Invention

The present invention relates to the projection of visual information commensurate with transparencies selected from storage. More specifically, this invention is directed to a random access projector and a multiple frame storage cartridge therefore. Accordingly, the general objects of the present invention are to provide novel and improved methods and apparatus of such character.

2. Description of the Prior Art

Apparatus for providing a visual presentation of information stored in the form of a transparency is, of course, well known. Examples of such display devices are the commonly employed slide projectors and microfilm readers. There are numerous applications where random access to particular slides or frames in the multi-transparency storage cartridge loaded into the projector or reader is required. By way of example only, a random access slide projector is a valuable teaching aid which may be employed as part of a teaching machine of the type disclosed in copending U.S. Application Ser. No. 293,434, now U.S. Pat. No. 3,832,790, issued Sept. 3, 1974, which is assigned to the assignee of the present invention. The teaching machine of copending Application Ser. No. 293,434 is a computer based device which generates signals commensurate with the numerical position in a storage cartridge of a slide which is to be displayed.

Prior art random access slide projectors have employed a conventional rotary tray as the storage medium or cartridge; the individual slides from which the presentation is to be selected being individually inserted in such tray. The use of individual slides obviously presents the possibility that the slides will become jammed, as they are mechanically moved into and out of the optical light path of the projector, lost or inadvertently arranged in the improper order. Due to the necessity of physically manipulating the individual slides into and out of the projection position, the slides also become worn and, if the slides are mounted in individual mechanical holders, the holders become worn or bent thus aggravating the jamming problem.

Prior art random access slide projectors have also been characterized by slow operational speed; i.e., a comparatively long access time; resulting from the necessity to rotate the tray in a circular path, either clockwise or counterclockwise, to the position commensurate with presentation of the desired transparency. The requisite tray indexing mechanism, in combination with the means for manipulating each individual slide, has resulted in a complex mechanical mechanism characterized by the need for constant maintenance.

A further disadvantage of prior art random access slide projectors is that they require separate expensive interface logic if the devices are to be mated to a computer or computer based trainer.

SUMMARY OF THE INVENTION:

The present invention overcomes the above briefly discussed and numerous other deficiencies and disadvantages of prior art random access slide projectors by providing a novel and improved projector and a multi-frame transparency storage cartridge therefore. Thus, in accordance with the present invention, a random access slide projector and cartridge are provided which, in combination are characterized by greatly improved access time, substantially increased reliability, total elimination of the problems of losing, jamming or disordering the individual transparencies and ease of interface with a computer or other logic circuitry.

The above discussed and numerous other advantages are achieved by means of a digitally controlled projector which employs a cartridge in the form of a transparent disc. The disc has, laminated thereto, a plurality of transparencies. The transparencies are in the form of frames arranged in a spiral pattern.

The projector itself includes a translatable and rotatable table which supports the cartridge-disc. A digitally controlled stepping motor is utilized to impart both rotation and translation to the table whereby the disc will move in a spiral path to position the frames thereon in the optical light path of the projector at a rapid rate.

The digital control circuitry for the disc drive motor causes the motor to reach full speed in accordance with a preselected schedule and also causes the motor to slow down, also in accordance with a preselected schedule, as the selected slide approaches the projection position. Incorporation of this "ramp up" and "ramp down" capability in the digital control circuitry eliminates the problems of overshoot and hunting. The control circuitry also includes means for returning the disc to a preselected position, typically commensurate with display of frame number 1, when power is applied to the projector.

BRIEF DESCRIPTION OF THE DRAWING:

The present invention may be better understood and its numerous objects and advantages will become apparent to those skilled in the art by reference to the accompanying drawing wherein like reference numerals refer to like elements in the several figures and in which:

FIG. 5 is an enlarged view of the disc indexing portion of the apparatus of FIG. 3, the view in FIG. 5 being taken transverse to that of FIG. 3 along line 5—5 of FIG. 4;

FIG. 6 is a top plan view of an electro-mechanical shutter device which may be incorporated in the apparatus of FIG. 3; and FIGS. 7A, 7B and 7C comprise a block diagram of the control circuitry for the motor which causes the indexing movements of the disc in the disclosed embodiment of the invention.

Figure 2:
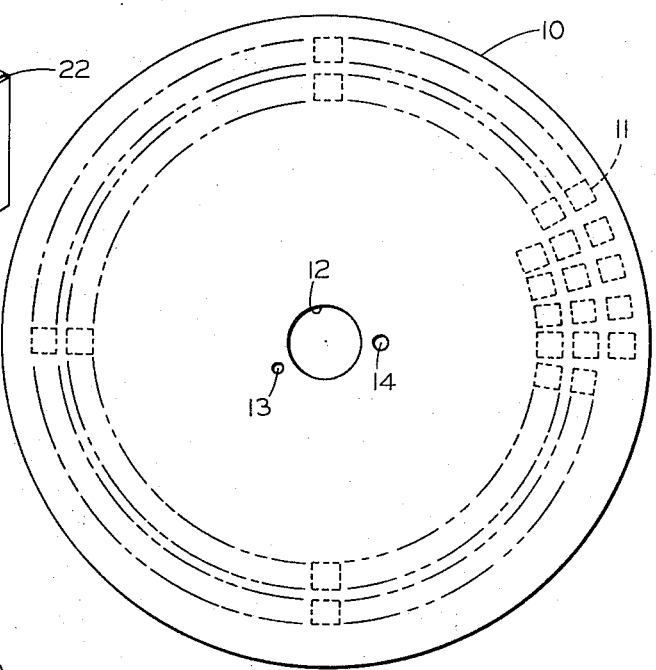
FIG. 2 is a top plan view, on an enlarged scale when compared to FIG. 1, of a transparency carrying disc which may be inserted in the projector of FIG. 1.

DESCRIPTION OF THE PREFERRED EMBODIMENT:

Referring first to FIG. 2, in accordance with the disclosed embodiment information to be projected is presented in the form of a plurality of transparencies 11 arranged in a spiral pattern of frames on a disc 10. Disc 10 prepared by first arranging a plurality of 35 millimeter slides in the requisite spiral pattern to define a large master; there being 100 slides in accordance with one embodiment of the invention. The master is then photographed on a negative which is the size and shape of disc 10. After being developed, the negative is laminated, emulsion side down, to a clear plastic disc to define the disc 10. The resulting disc, as represented in FIG. 2, thus comprises a plurality of frames or slides arranged in a spiral pattern about the center axis of the disc; the disc having an aperture 12 at the center to permit positioning on the hub of a movable supporting table. Disc 10 is also provided with a pair of indexing holes 13 and 14 which are diametrically offset from one another. Indexing hole 14 is larger than hole 13 and the two holes cooperate to insure proper positioning of the disc on the supporting table. As will become apparent from the discussion below, holes 13 and 14 receive drive pins and thus insure that the disc moves with the supporting table.

Figure 1:
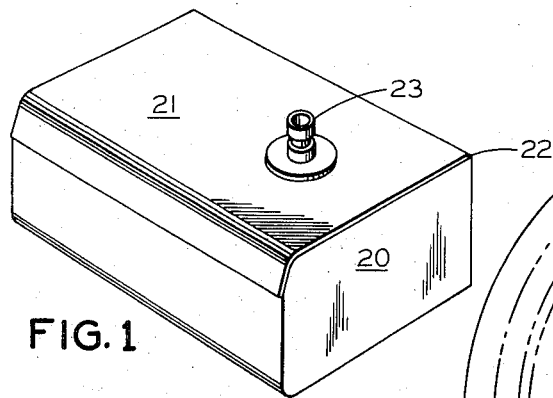
FIG. 1 is a perspective view of a first embodiment of a random access projector in accordance with the present invention.

With reference to FIG. 1, the projector is provided with a case 20 having a cover 21 attached thereto by hinges along edge 22. A projection lens assembly 23 is mounted on and projects through cover 21 as may be seen from joint consideration of FIGS. 1 and 3.

Figure 4:
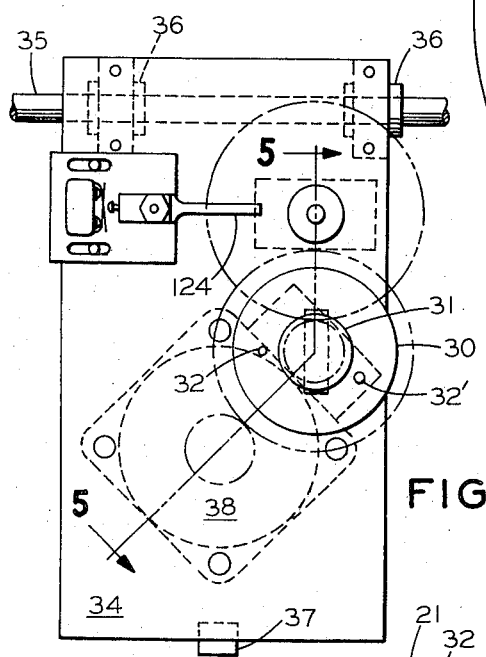
FIG. 4 is a top plan view of the supporting mechanism for the disc of FIG. 2, the apparatus of FIG. 4 comprising a portion of the mechanism shown in FIG. 3.
Figure 3:
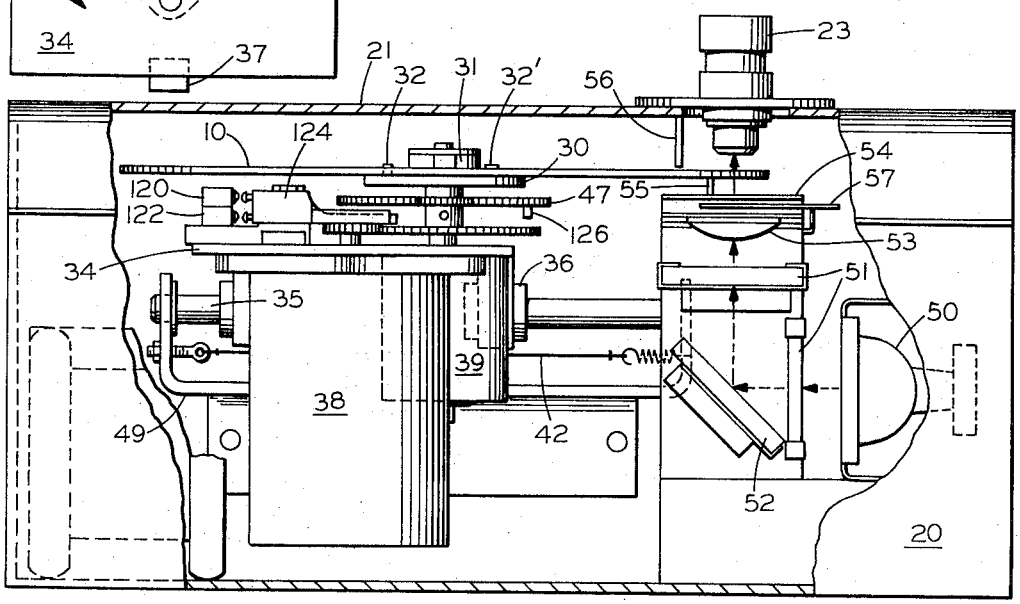
FIG. 3 is a side elevation view of the projector of FIG. 1 partly broken away to depict the electro-mechanical elements of the disclosed embodiment of the invention.

A disc 10 is loaded into the projector by opening cover 21 and placing the disc on a rotatable supporting table 30 which is shown in FIGS. 3–5. The table is provided with an upwardly extending hollow hub 31 and a pair of index pins 32–32'. The center aperture 12 of disc 10 is commensurate in size with hub 31 and the disc is mounted on the hub by registering pins 32, 32' respectively with holes 13 and 14 in disc 10. As may best be seen from FIG. 5, hub 31 provides a housing for a spring loaded retaining mechanism which is retracted by urging operating levers 33 toward one another to direct the retaining wings into the hub. After installation of disc 10 the levers 33 are released whereupon the retaining mechanism wings will be extended and will hold disc 10 against the top of table 30.

The rotatable table 30 is in turn supported from a longitudinally movable platform 34. Platform 34, as may best be seen from a joint consideration of FIGS. 4 and 5, is slidably supported at one end on a guide rail 35 by means of linear ball bearings 36. At its opposite end; i.e., along the edge opposite to that supported by guide rail 35; platform 34 is provided with one or more support members comprised of a low friction material such as nylon. A single such support member is indicated at 37 in FIG. 4. The support member 37 engages a rail or track (not shown) mounted on the interior of case 20. As will be described in greater detail below, all of the components of the drive mechanism which imparts the desired spiral movement to disc 11 will be supported from platform 34.

Referring to FIG. 5, the drive mechanism for rotatable table 30 and longitudinally movable platform 34 comprises a stepping motor 38, gearing which will be described below, a bearing block 39 for the disc support table 30, a linear drive drum 40 and a bearing block 41 therefore and a drive cable 42. The housing for motor 38 and the bearing blocks 39 and 41 are mounted by means of any suitable mechanical fastening means from the underside of platform 34 as shown. A drive gear 43 is keyed to the output shaft of stepping motor 38. The motor drive gear 43 engages a first gear 44 which is keyed to a drive shaft 45 which extends through bearing block 39 and engages hub 31 of rotatable table 30. A further drive gear 46 is also keyed to shaft 45 and rotates therewith. Gear 46 meshes with a further gear 47 keyed to a shaft 48 which extends through bearing block 41 and is affixed to the linear drive drum 40. The drive cable 42 passes through a hole provided therefore in drum 40 and is wrapped around drum 40 as shown. As may be seen from FIG. 3, the opposite ends of cable 42 are anchored to the support bracket 49 for shaft 35; a spring being employed at one end of cable 42. The support bracket 49 is affixed to case 20. As the output shaft of motor 38 rotates, rotational motion will be imparted to the table 30 on which the disc 10 rests directly via gears 43 and 44. Simultaneously, linear motion will be imparted to platform 34 due to engagement of linear drive drum 40 by cable 42; the drum 40 being rotated by motor 38 through the drive train comprising gears 43, 44, 46 and 47. The rotation of drum 40 will cause the drum and thus platform 34 to move along rail 35 and the combined linear and rotational motion will impart a spiral motion to disc 10.

Referring to FIG. 3, the optics of the projector, in addition to projecting lens 23, comprises a lamp 50, a pair of infrared filters 51 included in the interest of minimizing the thermal energy input to the disc 10, a mirror 52 and a condenser lens 53. The optics of the projector are mounted within case 20 in a fixed position. The drive mechanism for disc 10 is arranged such that a disc may be indexed so as to present selected slides or frames 11 centered with the optical axis of lens 23. The supporting structure for filters 51, mirror 52 and lens 53 is provided with an apertured top plate 54. As may be seen from joint consideration of FIGS. 3 and 6, a spring 55 having a high point positioned adjacent the center of the aperture in plate 54 is mounted on the top of plate 54; the high point on spring 55 engaging the underside of disc 10. Spring 55 urges disc 10 against a pair of spacially displaced nylon stops 56, only one of which is shown in FIG. 3, which extend downwardly from the cover 21 of case 20. Spring 55 and nylon stops 56 cooperate to prevent any wobble of disc 10 which might result in presentation of a slide or frame in the optical light path in a position which would result in an out-of-focus projection. The spring 55 and stops 56 are positioned to contact disc 10 in the spiral area between the turns of the spiral defined by the transparencies. The spring and stops contain the disc within reasonable limits and are adjusted to provide only a minimum amount of pressure.

While projection lens 23 has been shown as a fixed focus lens it would, of course, be within the capabilities of one skilled in the art to employ a manually or automatically adjustable lens. In the interest of avoiding a blurred presentation during periods when disc 10 is being indexed to a new frame, means are provided to interrupt the delivery of light to projection lens 23 during movements of the disc. In accordance with the disclosed embodiment, the light interrupting means is an electro-mechanical "wink" shutter mechanism 57 which employs a rotary solenoid 58. Energization of solenoid 58 is achieved in the manner to be described below in the discussion of FIG. 7. Alternatively, the wink solenoid may be replaced by electronic switching means for interrupting the current to the filament of lamp 50.

Again referring to FIG. 3, a pair of microswitches 120 and 122 are mounted, by means of a support plate, on platform 34. Microswitches 120 and 122 are normally open and are operated by a pivotal actuator mechanism 124. The actuator mechanism 124 is, in turn, operated by a home contact pin 126 which extends from the bottom of gear 47. In the manner to be described below, when power is initially applied to the projector motor 38 will be operated in the proper direction to cause disc 10 to be driven to its "home" position commensurate with presenting frame number 1 to the optical axis of lens 23. In the home position the pin 126 will cause actuator arm 124 to close switches 120 and 122 thereby providing an indication to the logic circuitry of FIG. 7 that the projector has been cleared and set to the proper initial position whereby indexing commands can be received.

Figure 7A:
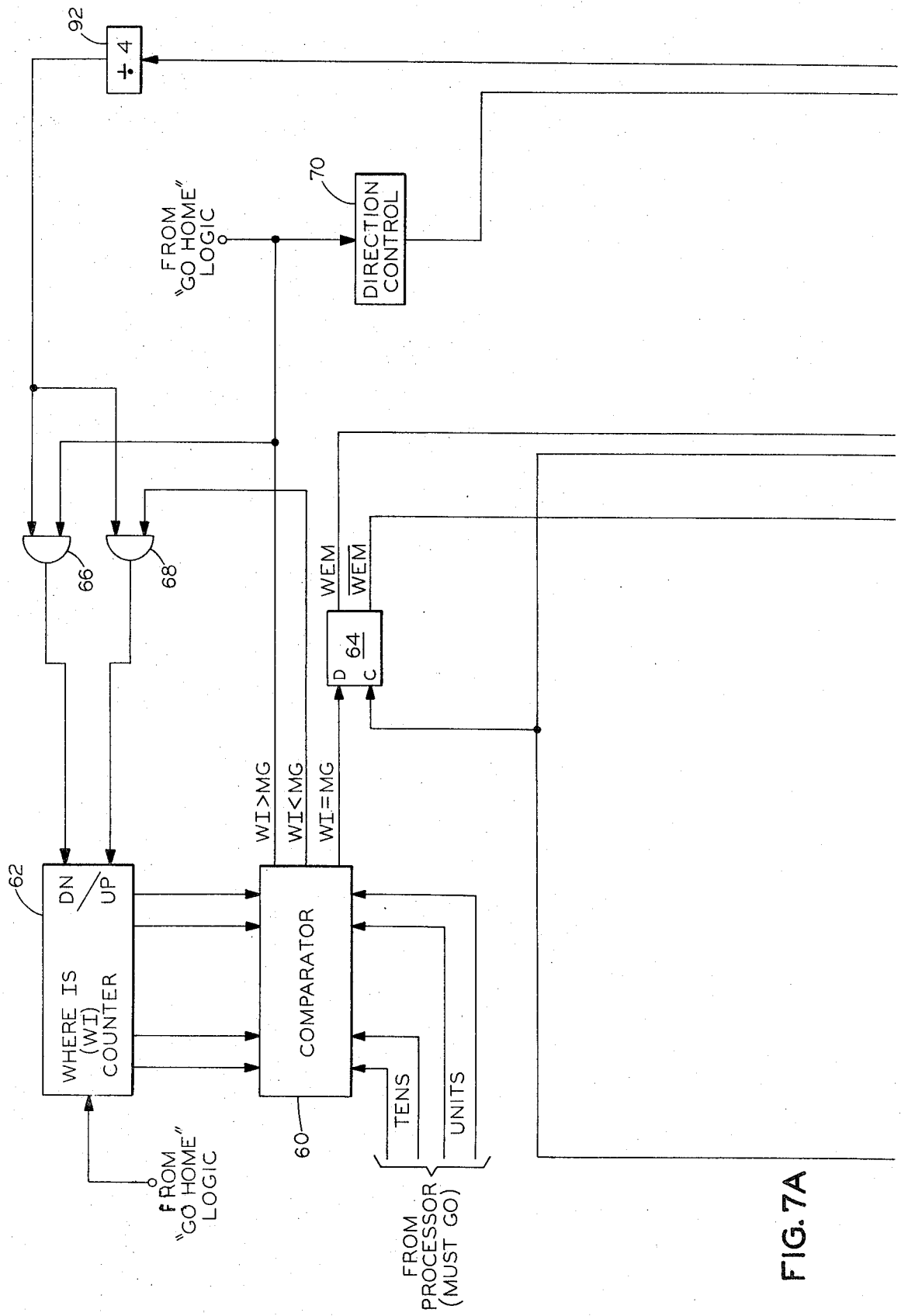
Figure 7B:
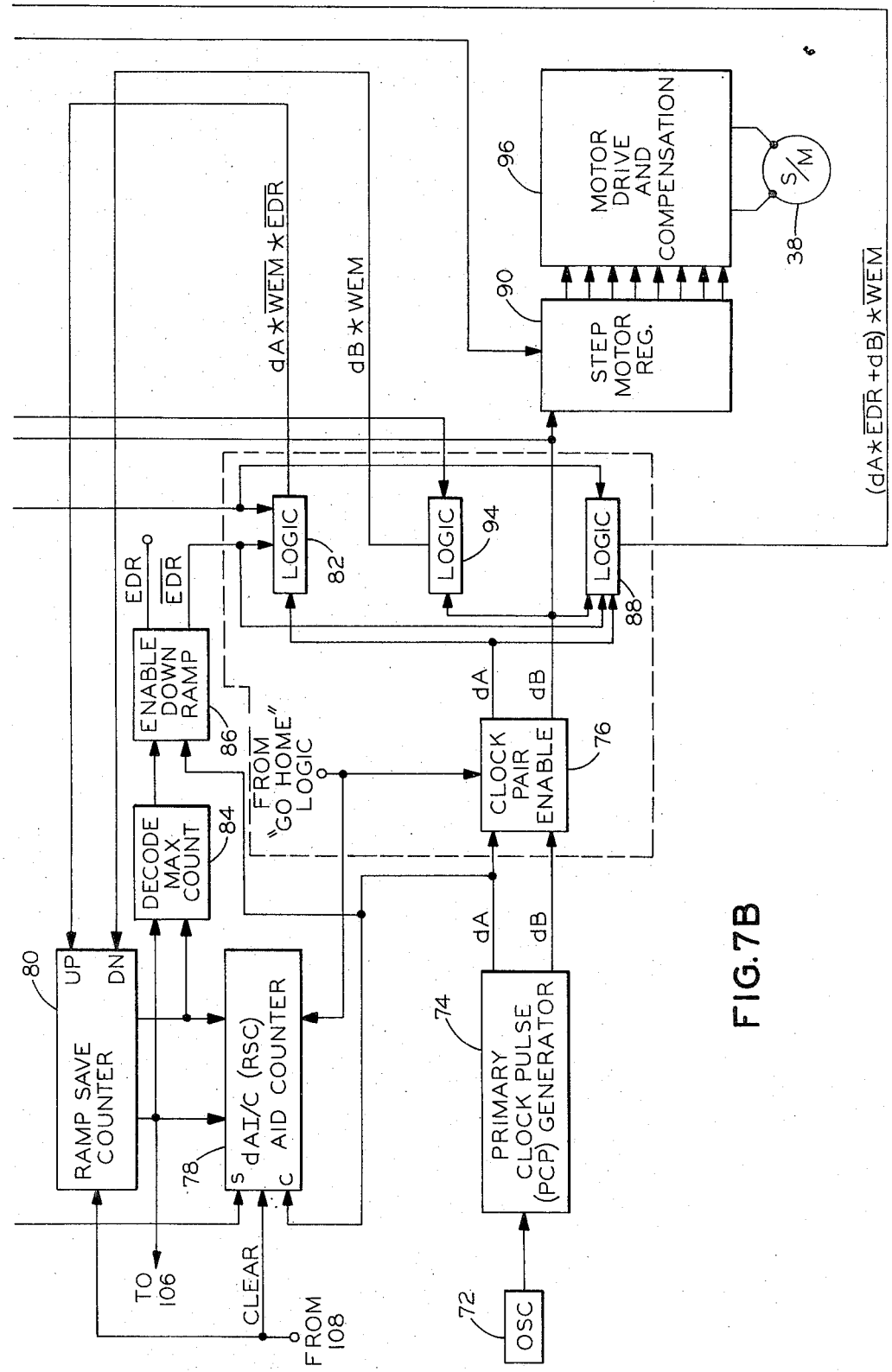

Referring now to FIG. 7, the electronics for controlling the stepping motor 38 is shown in block diagram form. An input command signal comprising a frame number in digital form is applied to a comparator 60. The input command or "must go" (MG) signal may, for example, be provided by the data processor of a trainer of the type disclosed in copending application Ser. No. 293,434. Comparator 60 may, for example, comprise a pair of four bit comparators. The other inputs to comparator 60 are provided by a "where is" (WI) counter 62 which may comprise a pair of cascade connected four bit up/down decade counters. In the manner to be described below, in the static position counter 62 will store a number corresponding to the frame positioned for presentation. In its dynamic mode, when a new frame is being positioned for presentation, counter 62 will temporarily contain a "false" indication of stepping motor position.

The comparator 60 is provided with three output terminals respectively commensurate with the results of a comparison showing that the newly requested frame occupies a position on disc 10 commensurate with a number less than that corresponding to the previously presented frame (WI > MG), that the requested frame has a number greater than the last presented frame (WI < MG) and that the frame being called for by the processor is positioned for projection (WI = MG). The WI = MG signal is applied to a bistable circuit 64 which provides, in the manner known in the art, a pair of output signals indicative of whether the stepping motor 38 should be repositioned or has achieved the desired position; these output signals respectively being indicated as $\overline{\text{WEM}}$ and WEM. The remaining two outputs of comparator 60 are applied to respective AND gates 66 and 68 whereby the WI > MG signal permits counts, generated in the manner to be described below, to be applied to the "down" count terminal of counter 62 and the WI < MG signal is employed to enable gate 68 whereby the counter 62 will be counted in the "up" direction. The WI > MG signal is also applied to a direction control circuit 70. Circuit 70 will be a bistable logic circuit which provides a d.c. output level commensurate with whether the stepping motor 38 should be repositioned in the clockwise or counterclockwise direction. Such direction control circuits are well known in the art and are conventionally supplied by the stepping motor manufacturer.

Control pulses for application to stepping motor 38 are generated by a free-running oscillator 72. In a preferred embodiment, oscillator 72 provided a square wave output signal with a period of four milliseconds. This square wave output signal is applied to a primary clock pulse (PCP) generator 74. The primary clock pulse generator 74 comprises a logic circuit which generates a pair of sequenced positive clock pulses during each cycle of the output signal provided by oscillator 72; the PCP generator including a division circuit and a pair of monostable multivibrators. The first or dA clock pulse provided by PCP generator 74 is synchronized with the leading edge of a first positive going output pulse from oscillator 72 and the second or dB clock pulse is synchronized with the leading edge of the next successive oscillator pulse leading edge; the leading edges of the dA and dB signals thus being separated by four milliseconds in a preferred embodiment and the output of PCP generator 74 having a period of 8 milliseconds.

The dA and dB clock pulses from generator 74 are applied to a "clock pair enable" circuit 76. Circuit 76 comprises a gating circuit which is enabled, in the manner to be described below, so as to selectively pass the clock pulse pairs applied thereto. The dA output pulse form PCP generator 74 is also applied to the count input of AID counter 78. In a preferred embodiment AID counter 78 comprised a four stage (16 count) counter with parallel and serial entry. In the manner to be described below, a "clear" pulse will be applied to counter 78 each time a new "must go" command is received by comparator 60. The AID counter 78 counts at the primary clock signal dA rate. The maximum or terminal count from AID counter 78 is applied to the control input of clock pair enable circuit 78. Accordingly, whenever counter 78 reaches its maximum count the terminal count output of counter 78 allows a pair of primary clock signals dA and dB to be qualified by clock pair enable circuit 76. A pair of qualified sequenced clock pulses dA and dB is used as follows:

dA - increments a "ramp save" counter 80 during up and top of ramp time,
  - is applied via logic circuitry to increment "where is" counter 62, and
  - defines the time of an "enable down ramp" signal.
dB - increments the "where is" counter 62,
  - pulses the drive logic for stepping motor 38,
  - defines the sample time for the "where is = must go" logic gate 64,
  - decrements the "ramp save" counter 80 during down ramp time, and
  - strobes the contents of the "ramp save" counter 80 into AID counter 78.

The parallel inputs to AID counter 78 are connected to a "ramp save" counter 80. The "ramp save" counter 80 may be identical to counter 78 and will be cleared by the same signal employed to clear counter 78. The number of primary dA clock pulses necessary to generate a terminal count from AID counter 78 is dependent on the number that is loaded into the counter 78 from "ramp save" counter 80. The count in "ramp save" counter 80 will be strobed into AID counter 78 each time a dB pulse is qualified by clock pair enable circuit 76. The initial count load will be zero. Therefore, the first terminal count from the AID counter 78 subsequent to receipt of a new "must go" command will occur when 16 primary dA clock pulses have been generated. This terminal count will cause clock pair enable circuit 76 to qualify the pair of sequenced clock signals dA and dB. The qualified dA clock signal is applied to a logic circuit 82. Additional inputs to logic circuit 82 are the $\overline{WEM}$ signal from bistable circuit 64 and an $\overline{EDR}$ (enable down ramp not energized) signal to be generated in the manner to be described below. Logic circuit 82 will comprise a plurality of logic gates interconnected in a manner which will be obvious to those skilled in the art to produce an output in accordance with the expression:

$$dA*\overline{WEM}*\overline{EDR}$$

The output signal from logic circuit 82 is applied to the "up" count terminal of "ramp save" counter 80 and, accordingly, each terminal count provided by AID counter 78 will result in the generation of a pulse which increments the "ramp save" counter.

The subsequently generated dB signal of a qualified clock pair will, as noted above, strobe the count in "ramp save" counter 80 into AID counter 78. Accordingly, during the next sequence, only 15 primary dA counts will have to be delivered to AID counter 78 to generate the terminal count which qualifies the pair of sequenced clocks dA and dB. This sequence will continue in repetitive fashion until "ramp save" counter 80 has been filled; the number of primary clock pulses necessary to qualify the next pair of clock pulses being reduced in increments of 1. Thus, each time a clock pair is qualified by circuit 76 the number of clock pulses required to fill AND counter 78 is reduced by 1 until either the maximum count has been reached in "ramp save" counter 80 or the contents of the "where is" counter 62 equals the contents of the "must go" counter (comparator 60).

The incrementing of "ramp save" counter 80 to its maximum count will be sensed by a maximum count decoder circuit 84. Circuit 84 may be merely a gating circuit which provides an output signal to an "enable down ramp" circuit 86 when counter 80 has been filled. The "enable down ramp" circuit 86 will comprise a bistable circuit which will be set by the output of decoder 84 and periodically reset by the application of the dA primary clock pulses from generator 74.

As mentioned above, the $\overline{EDR}$ signal from circuit 86 is applied to logic circuit 82. This $\overline{EDR}$ signal is also applied as an input to a further logic circuit 88. Additional inputs to circuit 88 are the qualified dA and dB clock pulses passed by clock pair enable circuit 76 and the $\overline{WEM}$ signal from circuit 64. By means of the interconnection of a plurality of individual logic gates in a manner which will be obvious to those of ordinary skill in the art, logic circuit 88 provides an output signal which satisfies the expression:

$$(dA*\overline{EDR}+dB)*\overline{WEM}$$

Logic circuit 88 thus provides an output pulse commensurate with each qualified dA pulse until "ramp save" counter 80 has been filled and further output pulses commensurate with each qualified dB pulse; the output of logic circuit 88 being terminated when the count is counter 62 equals the input command from the processor as applied to comparator 60.

The qualified dB pulses passed by clock pair enable circuit 76 are also applied directly to the stepping motor register 90 and thus each qualified dB pulse causes stepping motor 37 to move one step in the appropriate direction; the output of direction control circuit 70 also being applied as an input to the stepping motor register 90. Thus, until such time as the "ramp save" counter 80 is filled, for each drive pulse applied to stepping motor register 90 a pair of pulses will appear at the output of logic circuit 88. After "ramp save" counter 80 has been filled; i.e., the "ramp save" counter has "saved" 16 counts in the embodiment being described; only pulses commensurate with each qualified dB pulse will appear at the output of logic circuit 88 until the number of counts delivered to "where is" counter 62 has caused counter 62 to count up or down as appropriate to the number loaded into comparator 60 by the processor. The output of logic circuit 88 is applied to a divide by four circuit 92 and thence, via either of AND gates 66 and 68, to "where is" counter 62. The divide by four circuit 92 is employed since the stepping motor will move four steps between successive frame locations on disc 10. As should now be obvious, "where is" counter 62 will count to the WI=MG condition in advance of the stepping motor actually reaching the desired position as a result of the counts "saved" in "ramp save" counter 80.

Upon receipt of a new "must go" command, in the manner described above, the stepping motor 38 will be brought up to speed in accordance with a curve having a slope determined by the capacity of counters 78 and 80. Once the "ramp save" counter 80 has been filled, and the numbers in counter 62 and comparator 60 are unequal, the output shaft of the stepping motor will be moved at its maximum speed with each dB output pulse from primary clock pulse generator 74 being qualified and delivered via clock pair enabling circuit 76 to the stepping motor register 90. When the enable down ramp $\overline{EDR}$ signal from circuit 86 is qualified and WEM is not, the "ramp save" counter 80 will receive no further "up" count clocks. However, "ramp save" counter 80 will continue to hold its present count until WEM is qualified. When WEM is qualified the qualified dB clocks will decrement ramp save counter 80 for each terminal count pulse of AID counter 78. Thus, after stepping at full speed in the appropriate direction to null the position error signal provided by comparator 60, the rate of movement of the stepping motor will be ramped down as the desired frame on disc 10 is approached. The signals for causing the decrementing of "ramp save" counter 80 are provided by a logic circuit 94 which receives, as the inputs thereto, the dB signals passed by clock pair enable circuit 76 and the WEM output of circuit 64. Logic circuit 94 thus, as will be obvious to those of ordinary skill in the art, comprises an AND gate which satisfies the expression:

$$dB*WEM$$

Accordingly, one additional PCP time is required between qualified clock pairs for each cycle as "ramp save" counter 80 is counted down thereby resulting in a decreasing step ramp. The proper number of clock pairs, qualified by clock pair enable circuits 76, commensurate with the frames to be stepped will be generated since the AID counter 78 has saved a count in the "ramp save" counter 80 at the same time it reduced the time until the next clock pair was generated on the "ramp up". The counts that were "saved" during the "ramp up" are taken away, one at a time, by each successive qualified clock pair during the down ramp time. Each clock subtracted from "ramp save" counter 80 increases the time until the next clock pair from PCP generator 74 will be enabled by circuit 76 by one PCP due to the additional PCP necessary to reach the terminal count of the AID counter 78 during "ramp down." The "ramp down" continues until "ramp save" counter 80 reaches zero. At this time the "where is" counter 62 will, of course, indicate the true frame number, the projector busy logic is reset, and the projector disc 10 will have been positioned to the frame requested by the "must go" input from the processor to comparator 60.

In one embodiment the stepping motor register 90 comprised a TTL DIP 74195 connected to operate as a bi-directional shift register. The direction of rotation of motor 38 will be determined by the shift direction of the register which is controlled by the output of direction control circuit 70. As explained above, direction control circuit 70 provides a d.c. output voltage level commensurate with the required direction of rotation of motor 38. Stepping motor register 90 will provide control signals commensurate in number with the number of phases of motor 38 to a motor drive and compensation circuit 96. Circuits 90 and 96 are both commercially available motor control circuits and may be supplied by the motor manufacturer. Circuit 96 will comprise current limiting regulators and solid state switches whereby constant current may be selectively delivered from a d.c. source, not shown, to the windings of motor 38.

Upon application of power to the projector, disc 10 will be initially driven to a position commensurate with presenting frame number 1 in registration with lens 23. In the manner to be described below, during this initial indexing the projector will be prevented from reacting in response to "must go" commands. The initial indexing is achieved by means of the logic circuitry shown in FIG. 7C. Application of power to the projector is sensed by a pulse generator 100 which delivers an output pulse to OR gate 102. A second input to gate 102 is a "clear" signal which may be manually generated by means of an operator controlled switch, not shown. In response to either of the inputs applied thereto, gate 102 will deliver an "on" command signal to the "go home" binary logic circuit 104. Circuit 104 will be a bistable circuit which, in response to an "on" command, will qualify a "ccw" output signal which is applied to direction control circuit 70. This "ccw" signal will remain present until circuit 104 is reset by an output signal generated by the closing of normally open "home" switch 120 in the manner described above; the signal provided by the closing of switch 120 being applied to the "off" input of logic circuit 104. The signal qualified by the turning "on" of circuit 104 is also applied to the enable gate 76 whereby clock pulses will be delivered to stepping motor 38 and, under the control of circuit 70, the motor will be stepped in the counterclockwise direction. Additionally, the "ccw" signal from circuit 104 is employed to initialize counters 68, 78 and 80 whereby the counters will be cleared. The initial clearing of "where is" counter 68 and the exercise of control over direction control logic circuit 70 by the output of "go home" logic 104 will prevent the projector from reacting to any "must go" commands present at the input to comparator 60 until logic circuit 104 is reset by an "off" input from the home switch 120.

To summarize the initiating operation, any time the "go home" control binary 104 is qualified the direction control logic 70 will call for counterclockwise rotation of disc 10. If the "go home" control binary has not qualified; i.e., go home = "1"; and "where is" is greater than "must go" (WI > MG = "1"), the output signal of direction control logic 70 will call for a counterclockwise rotation of the disc. Thus, the disc 10 must rotate in the counterclockwise or "ccw" direction only under the conditions of WI > MG or when the "$\overline{\text{go home}}$" logic 104 has been activated by an "on" signal from OR gate 102.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A projector comprising:
   stationary projection lens means, said lens means having an optical axis;
   means for generating a light beam, said light beam generating means being displaced from said lens means and providing a light beam aligned with the optical axis of said lens means;
   a transparency storage medium, said storage medium including a plurality of transparencies arranged in a frame pattern which defines a spiral;
   movable table means for removably supporting said transparency storage medium in a plane generally transverse to said lens means optical axis, said storage medium extending from said table means into the space between said lens means and light beam generating means;
   motor means, said motor means including a motor having a rotatable output shaft;
   a platform;
   means mounting said platform for movement in a direction transverse to said lens means optical axis;
   means mounting said motor means from said platform;
   rotational drive means coupling said motor means motor output shaft to said table means for causing rotation of said table means;
   linear drive means coupling said motor means motor output shaft to said platform mounting means whereby rotation of said shaft is translated to linear motion of said platform and rotational and translational motion may be simultaneously imparted to said table means to present said storage medium frames seriatim on said optical axis; and
   control means for said motor means, said control means being responsive to input signals commensurate with the location in the pattern of a desired transparency to cause the motor to operate so as to position the storage medium with the desired trasparency on the lens means optical axis.

2. The apparatus of claim 1 wherein said storage medium comprises:
   a rigid sheet, said support sheet being at least partly transparent; and
   a photographic negative, said negative comprising a picture of a plurality of transparencies arranged in the desired order in the frame pattern, said negative being laminated emulsion side down to said support sheet with said transparencies in registration with transparent portions of said support sheet.

3. The apparatus of claim 2 wherein said support sheet comprises:
a clear plastic disc, said disc being provided with a central mounting aperture and at least a first indexing aperture.

4. The apparatus of claim 3 wherein said movable table means includes:
a disc support table, said table having a smaller diameter than said disc;
a hub extending from said disc support table, said hub being commensurate in size and shape with said disc central mounting aperture; and
means for retaining a disc on said table.

5. The apparatus of claim 1 wherein said linear drive means comprises:
a rotatable linear drive drum, said drive drum being mounted from said platform;
gear means coupling said drive drum to said motor output shaft; and
drive cable means, said drive cable means engaging said drive drum and being connected at the opposite ends thereof to said platform mounting means.

6. The apparatus of claim 5 wherein said storage medium comprises:
a support sheet, said support sheet being at least partly transparent; and
a photographic negative, said negative comprising a picture of a plurality of transparencies arranged in the desired order in the frame pattern, said negative being laminated to said support sheet with said transparencies in resistration with transparent portions of said support sheet.

7. A random access projector comprising:
stationary projection lens means, said lens means having an optical axis;
means for generating a light beam, said light beam generating means being displaced from said lens means and providing a light beam aligned with the optical axis of said lens means;
a transparency storage medium, said storage medium including a plurality of transparencies arranged in a frame pattern which defines a spiral;
movable table means for removably supporting said transparency storage medium in a plane generally transverse to said lens means optical axis, said storage medium extending from said table means into the space between said lens means and light beam generating means;
motor means, said motor means including a reversible stepping motor having a rotatable output shaft;
means for generating step control pulses for application to said motor means;
first counter means for totalizing the number of control pulses applied to said motor means;
comparator means connected to said first counter means and responsive to the counts stored therein and to input signals commensurate with the location in the pattern of a desired transparency for generating error signals indicative of the direction the motor must rotate to present the desired transparency on the lens means optical axis;
means responsive to error signals provided by said comparator means for gating control pulses from said control pulse generating means to said motor means;
means responsive to error signals provided by said comparator means for providing direction control signals to said motor means whereby the direction of rotation of said motor produced by the gated control signals will be commensurate with said comparator means error signals; and
means mechanically coupling said motor means motor output shaft to said table means, said coupling means simultaneously imparting rotational and translational motion to said table means so as to prevent the storage medium transparencies seriatim on said optical axis whereby the desired transparency may be positioned on the lens means optical axis in response to said gated control pulses and direction control signals.

8. The apparatus of claim 7 wherein said coupling means comprises:
a platform;
means mounting said platform for movement in a direction transverse to said lens means optical axis;
means mounting said motor means from said platform; rotational drive means coupling said motor means motor output shaft to said table means for causing rotation of said table means; and
linear drive means coupling said motor means output shaft to said platform mounting means whereby rotation of said motor output shaft is translated to linear motion of said platform.

9. The apparatus of claim 7 wherein said control pulse gating means comprises:
gating circuit means connected between said control pulse generating means and said motor means; and
means connected to said control pulse generating means and to said comparator means for providing control signals for said gating circuit means, the period between said gating circuit means control signals progressively decreasing toward and increasing from a maximum signal repetition rate subsequent to receipt of a new input signal by said comparator means.

10. The apparatus of claim 9 wherein said control pulse generating means comprises:
means for generating pairs of clock pulses, the clock pulses of each pair being spaced in time and being provided at separate output terminals of said clock pulse generating means.

11. The apparatus of claim 10 wherein said gating circuit means control signal providing means comprises:
second counter means, said second counter means having a control input and both serial and parallel entry, first pulses of each of said pairs of clock pulses being serially entered in said second counter means;
up-down counter means, said up-down counter means being connected for parallel data entry therefrom into said second counter means;
means connecting the control pulse input of said motor means to the control input of said second counter means whereby the count in said up-down counter means will be transferred into said second counter means whenever a clock pulse is delivered to said motor means;
means connecting a preselected stage of said second counter means to the control input to said gating circuit means whereby said gating circuit means is enabled when the total of the counts transferred from said up-down counter means and said first clock pulses equals a number commensurate with said preselected stage;

detector means for providing an output signal commensurate with said up-down counter means reaching a preselected count; and means responsive to error signals generated by said comparator means and to signals provided by said detector means for controlling the application of clock pulses passed by said gating circuit means to either the up or down count terminals of said up-down counter means.

12. The apparatus of claim 11 wherein said coupling means comprises:

a platform;

means mounting said platform for movement in a direction transverse to said lens means optical axis;

means mounting said motor means from said platform;

rotational drive means coupling said motor means motor output shaft to said table means for causing rotation of said table means; and linear drive means coupling said motor means motor output shaft to said platform mounting means whereby rotation of said motor output shaft is translated to linear motion of said platform.

13. The apparatus of claim 10 wherein said gating circuit means has a pair of input terminals and a pair of output terminals and is connected to both of said clock pulse generator means output terminals for passing both pulses of each clock pulse pair, pulses passed to one of said gating circiut means output terminals being delivered to said motor means, and wherein said control means further comprises:

means for controlling the counting rate of said first counter means, said counting rate controlling means being responsive to both clock pulses of each pair and to error signals generated by said comparator means for delivering both pulses of each gated clock pulse pair to said first counter means only during periods when the time between said gating circuit means control signals is increasing toward a maximum rate, the counting rate controlling means delivering a single pulse of each gated clock pulse pair to said first counter means only during periods when said gating circuit means control signals are being provided at the maximum rate.

14. The apparatus of claim 13 wherein said storage medium comprises:

a rigid support sheet, said support sheet being at least partly transparent; and a photographic negative, said negative comprising a picture of a plurality of transparencies arranged in the desired order in the frame pattern, said negative being laminated to said support sheet with said transparencies in registration with transparent portions of said support sheet.

15. The apparatus of claim 14 wherein said coupling means comprises:

a platform;

means mounting said platform for movement in a direction transverse to said lens means optical axis;

means mounting said motor means from said platform;

rotational drive means coupling said motor means motor output shaft to said table means for causing rotation of said table means; and linear drive means coupling said motor means motor output shaft to said platform mounting means whereby rotation of said motor output shaft is translated to linear motion of said platform.

16. The apparatus of claim 15 wherein said support sheet comprises:

a clear plastic disc, said disc being provided with a central mounting aperture and at least a first indexing aperture.

17. The apparatus of claim 16 wherein said movable table means includes:

a disc support table, said table having a smaller diameter than said disc;

a hub extending from said disc support table, said hub being commensurate in size and shape with said disc central mounting aperture; and means for retaining a disc on said table.

18. The apparatus of claim 17 wherein said coupling means comprises:

a platform;

means mounting said platform for movement in a direction transverse to said lens means optical axis;

means mounting said motor means from said platform;

rotational drive means coupling said motor means motor output shaft to said disc support table for causing rotation of said table; and linear drive means coupling said motor means motor output shaft to said platform mounting means whereby rotation of said motor output shaft is translated to linear motion of said platform.

\* \* \* \* \*